US010380664B2

(12) United States Patent
Trussel et al.

(10) Patent No.: US 10,380,664 B2
(45) Date of Patent: Aug. 13, 2019

(54) CREATION AND USE OF PUBLIC AND PRIVATE GROUPS IN A LOCATION SHARING APPLICATION

(71) Applicant: Glympse, Inc., Seattle, WA (US)

(72) Inventors: Bryan Gardner Trussel, Seattle, WA (US); James Stanton, Seattle, WA (US); Steve Miller, Seattle, WA (US); Craig Link, Seattle, WA (US); Yahor Pushkin, Seattle, WA (US)

( * ) Notice: Subject to any disclaimer, the term of this patent is extended or adjusted under 35 U.S.C. 154(b) by 1206 days.

(21) Appl. No.: 14/278,331

(22) Filed: May 15, 2014

(65) Prior Publication Data

US 2015/0262275 A1   Sep. 17, 2015
US 2016/0155170 A9   Jun. 2, 2016

Related U.S. Application Data

(63) Continuation-in-part of application No. 14/215,365, filed on Mar. 17, 2014, now abandoned.

(60) Provisional application No. 61/789,762, filed on Mar. 15, 2013.

(51) Int. Cl.
  *G06Q 30/06* (2012.01)

(52) U.S. Cl.
  CPC ..... *G06Q 30/0613* (2013.01); *G06Q 30/0609* (2013.01); *G06Q 30/0623* (2013.01); *G06Q 30/0639* (2013.01)

(58) Field of Classification Search
  CPC .................. G06Q 90/0613; G06Q 30/0613
  USPC ..................................... 705/26.35
  See application file for complete search history.

(56) References Cited

U.S. PATENT DOCUMENTS

| | | | | |
|---|---|---|---|---|
| 7,353,034 | B2* | 4/2008 | Haney | H04W 4/21 455/457 |
| 7,617,529 | B1* | 11/2009 | Wang | G06F 21/604 726/21 |
| 8,510,773 | B1* | 8/2013 | Abou-Rizk | G06Q 30/0261 725/32 |
| 2002/0169539 | A1* | 11/2002 | Menard | G01C 21/26 701/532 |
| 2008/0132251 | A1* | 6/2008 | Altman | G06Q 30/0207 455/457 |
| 2011/0282750 | A1* | 11/2011 | Rosen | G06F 17/3087 705/14.66 |
| 2012/0259842 | A1* | 10/2012 | Oman | G06Q 10/1093 707/722 |

(Continued)

OTHER PUBLICATIONS

Works Cited Ciocchetti, Corey A. "E-Commerce and Information Privacy: Privacy Policies as Personal Information Protectors." American Business Law Journal, vol. 44, No. 1, 2007, pp. 55-57, 77-89, 100-104, 111-123, 126. (Year: 2007).*

(Continued)

*Primary Examiner* — Alexis M Casey
(74) *Attorney, Agent, or Firm* — Perkins Coie LLP

(57) ABSTRACT

A mobile application uses computer-readable instructions for exchanging, viewing or providing location sharing information in a context of a public group, a private group or both. The location sharing information may be made available to aid or enhance commerce-related activities performed by a merchant, a consumer or both. In another embodiment, a method for authenticating a private group permits an authenticating user to restrict the private group and selectively allow subsequent participants restricted access to the private group.

17 Claims, 8 Drawing Sheets

(56) References Cited

U.S. PATENT DOCUMENTS

2013/0096827 A1\* 4/2013 McCall ................ G06Q 10/047
  701/533
2013/0226453 A1 8/2013 Trussel et al.

OTHER PUBLICATIONS

European Patent Office, Extended European Search Report, EP Patent Application 18155361.1, dated Apr. 17, 2018, 6 pages.

\* cited by examiner

CREATION AND USE OF PUBLIC AND PRIVATE GROUPS IN A LOCATION SHARING APPLICATION

PRIORITY CLAIM

The present application is a continuation-in-part of and claims the benefit of the filing date of U.S. patent application Ser. No. 14/215,365, filed on Mar. 17, 2014, which in turn claims the benefit of the filing date of U.S. Provisional Patent Application No. 61/789,762, filed Mar. 15, 2013, wherein both applications are incorporated herein by reference in their entireties.

FIELD OF THE INVENTION

The present invention generally relates to an application operable on a mobile communications device that allows for sharing of location information, and more specifically relates to an application operable on a mobile communications device in which public and private groups may be established and used to share location and other information between group participants.

SUMMARY

In one embodiment, the present invention generally relates to systems and methods that utilize computer-readable instructions for exchanging, viewing or providing location sharing information in a context of a public group, a private group or both. The location sharing information may be made available to aid or enhance commerce-related activities performed by a merchant, a consumer or both. In another embodiment, the present invention generally relates to a method for authenticating a private group to allow an authenticating user and potential subsequent users authenticated access to the private group.

In one aspect of the present invention, a computer-implemented method for merchant-to-consumer commerce includes the steps of (1) establishing a public group configured for a merchant to broadcast commerce-related information; (2) receiving a query from a consumer to view the commerce-related information based on a consumer-selected parameter; (3) when the consumer-selected parameter sufficiently matches the broadcast commerce-related information from the merchant, and (4) managing the commerce-related information broadcast to the public group.

In another aspect of the present invention, a method for sharing location information includes the steps of (1) providing location information to a server for access by a public group, wherein the location information is provided by a sender, and wherein the sender controls a duration of time for the location information; (2) appending the location information with one or more tags, wherein at least one tag provides additional information, over and above the location information, about the sender; and (3) at least one participant of the public group accessing the location information because of an interest in the sender or an interest in the at least one tag provided by the sender.

In yet another aspect of the present invention, a method for sharing location information with a private group includes the step of (1) establishing a name for the private group; (2) authenticating the private group to restrict access to at least location information made available by one or more participants of the private group; and (3) controllably and selectively providing access to users wishing to join the private group, wherein the users only join the private group by passing an authentication process.

BRIEF DESCRIPTION OF THE DRAWINGS

In the drawings, identical reference numbers identify similar elements or acts. The sizes and relative positions of elements in the drawings may not be necessarily drawn to scale. For example, the shapes of various elements and angles may not be drawn to scale, and some of these elements may be arbitrarily enlarged or positioned to improve drawing legibility.

DETAILED DESCRIPTION

Embodiments of the invention may be operational with numerous general purpose or special purpose computing system environments or configurations. Examples of well-known computing systems, environments, and/or configurations that may be suitable for use with the invention include, but are not limited to, personal computers (PCs), servers, networked computing systems, hand-held or laptop devices, multiprocessor systems, microprocessor-based systems, set top boxes, programmable consumer electronics, network PCs, minicomputers, mainframe computers, handsets, dynamic billboards, distributed computing environments that include any of the above systems or devices, and the like.

In one embodiment, the present invention generally relates to systems and methods that utilize computer-readable instructions for integrating a location sharing event with a messaging platform. In another embodiment, the present invention generally relates to systems and methods that utilize computer-readable instructions for providing notification of a future event and may optionally generate a location sharing event based on the notification. In yet another embodiment, the present invention generally relates to systems and methods that utilize computer-readable instructions for sharing routes between at least two computing devices.

Figure 1:
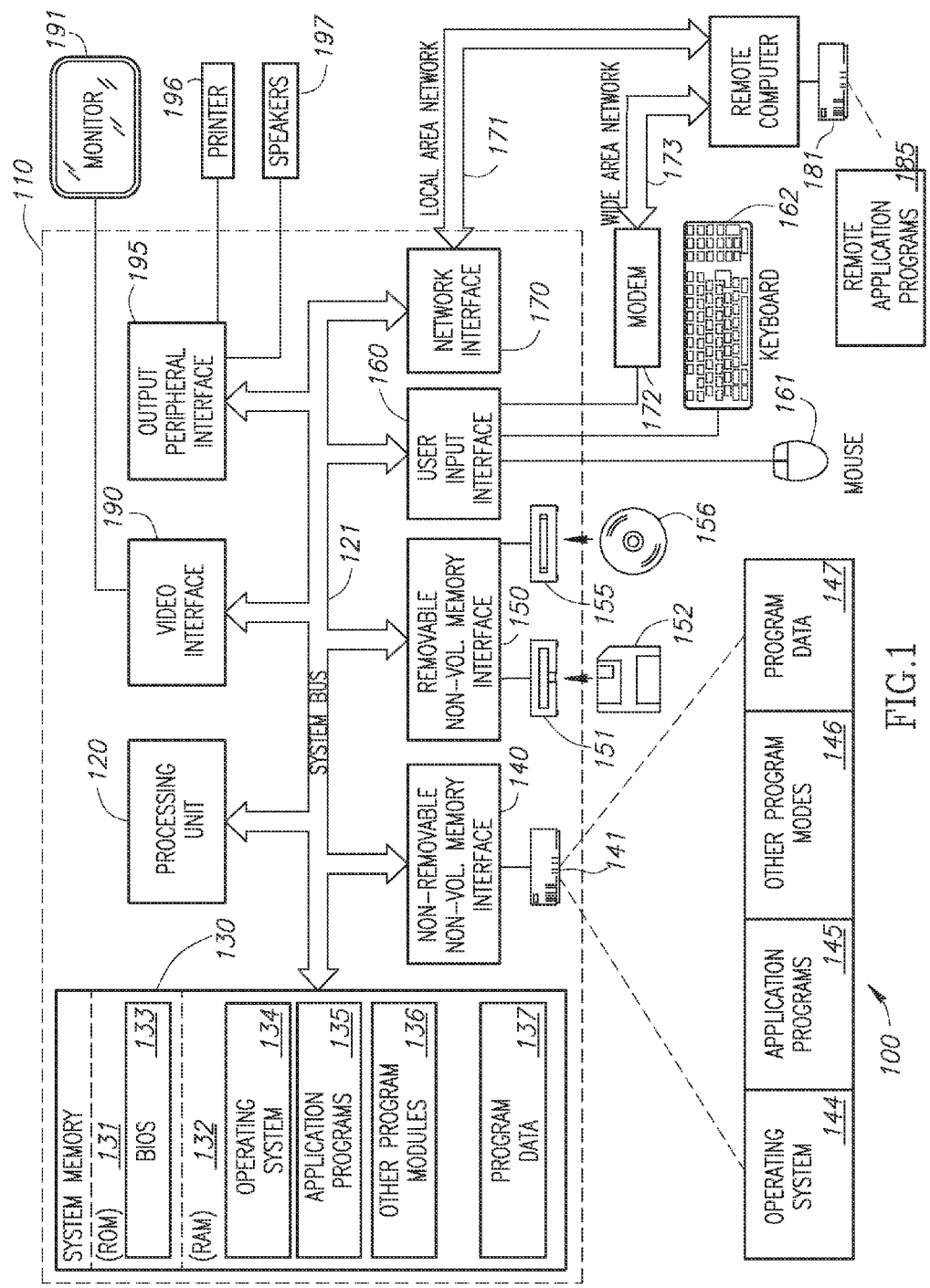
FIG. 1 is a diagram showing a suitable computing environment, such as a personal computer or personal mobile computing device, for practicing the systems and methods of various embodiments of the subject matter disclosed herein.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media may include volatile and nonvolatile media, and/or removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
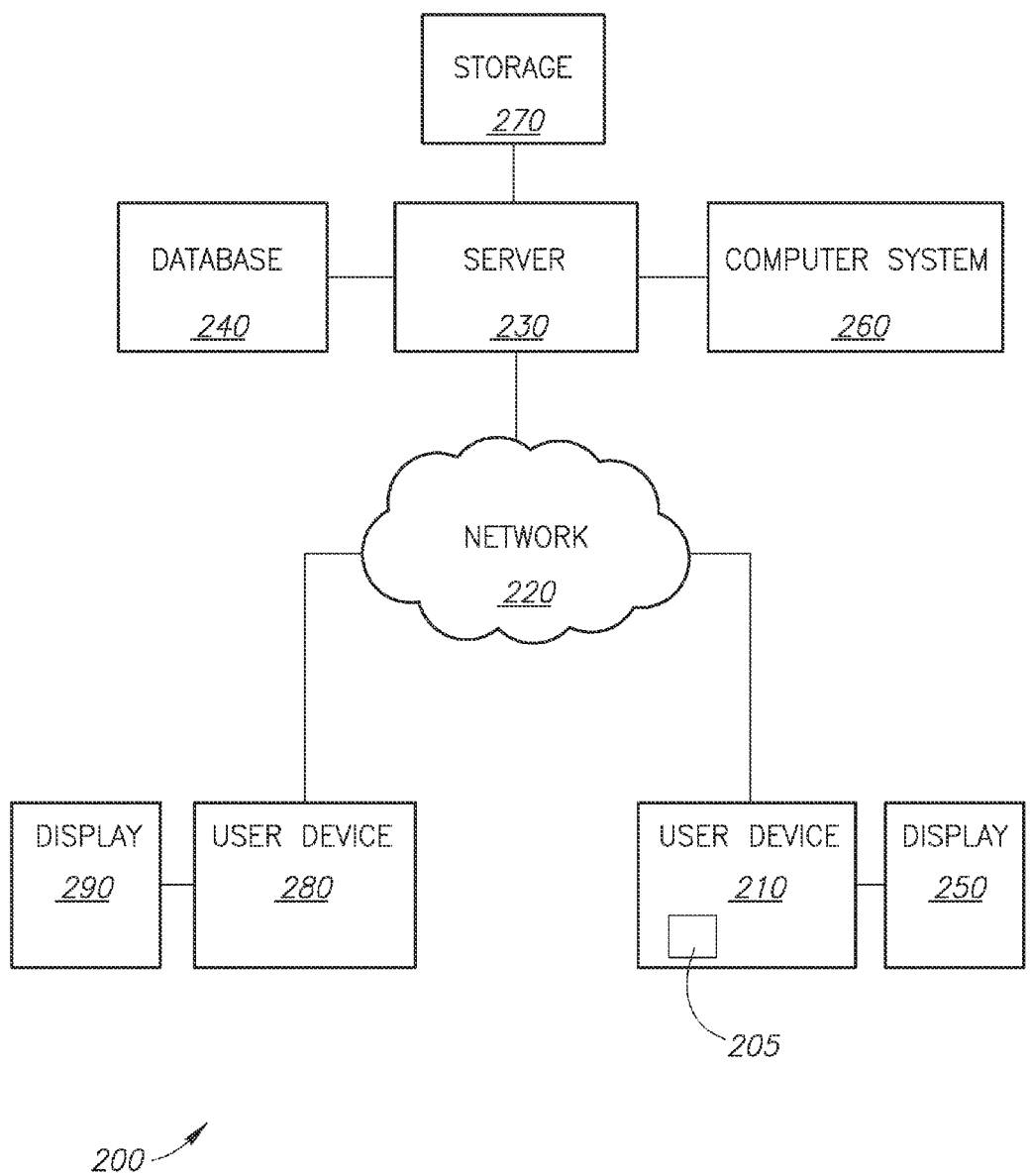
FIG. 2 shows a diagram of a suitable networked computing environment wherein a user may employ the various systems and methods of the subject matter disclosed herein.

Referring now to FIG. 2, an embodiment of the present invention can be described in the context of an exemplary computer network system 200 as illustrated. System 200 includes electronic user devices 210, 280, such as cellular or mobile telephones, personal computers or workstations, that are linked via a communication medium, such as a network 220 (e.g., the Internet), to an electronic device or system, such as a server 230. The server 230 may further be coupled, or otherwise have access, to a database 240, electronic storage 270 and a computer system 260. Although the embodiment illustrated in FIG. 2 includes one server 230 coupled to two user devices 210, 280 via the network 220, it should be recognized that embodiments of the invention may be implemented using two or more such user devices coupled to one or more such servers. Moreover, the network 220 may include or otherwise be coupled to one or more telecommunication towers (not shown) that provide network connectivity to one or more cellular or mobile telephones.

In an embodiment, each of the user devices 210, 280 and server 230 may include all or fewer than all of the features associated with the computer 110 illustrated in and discussed with reference to FIG. 1. User devices 210, 280 include or are otherwise coupled to a computer screen or display 250, 290, respectively. User devices 210, 280 can be used for various purposes including both network- and local-computing processes.

Figure 3:
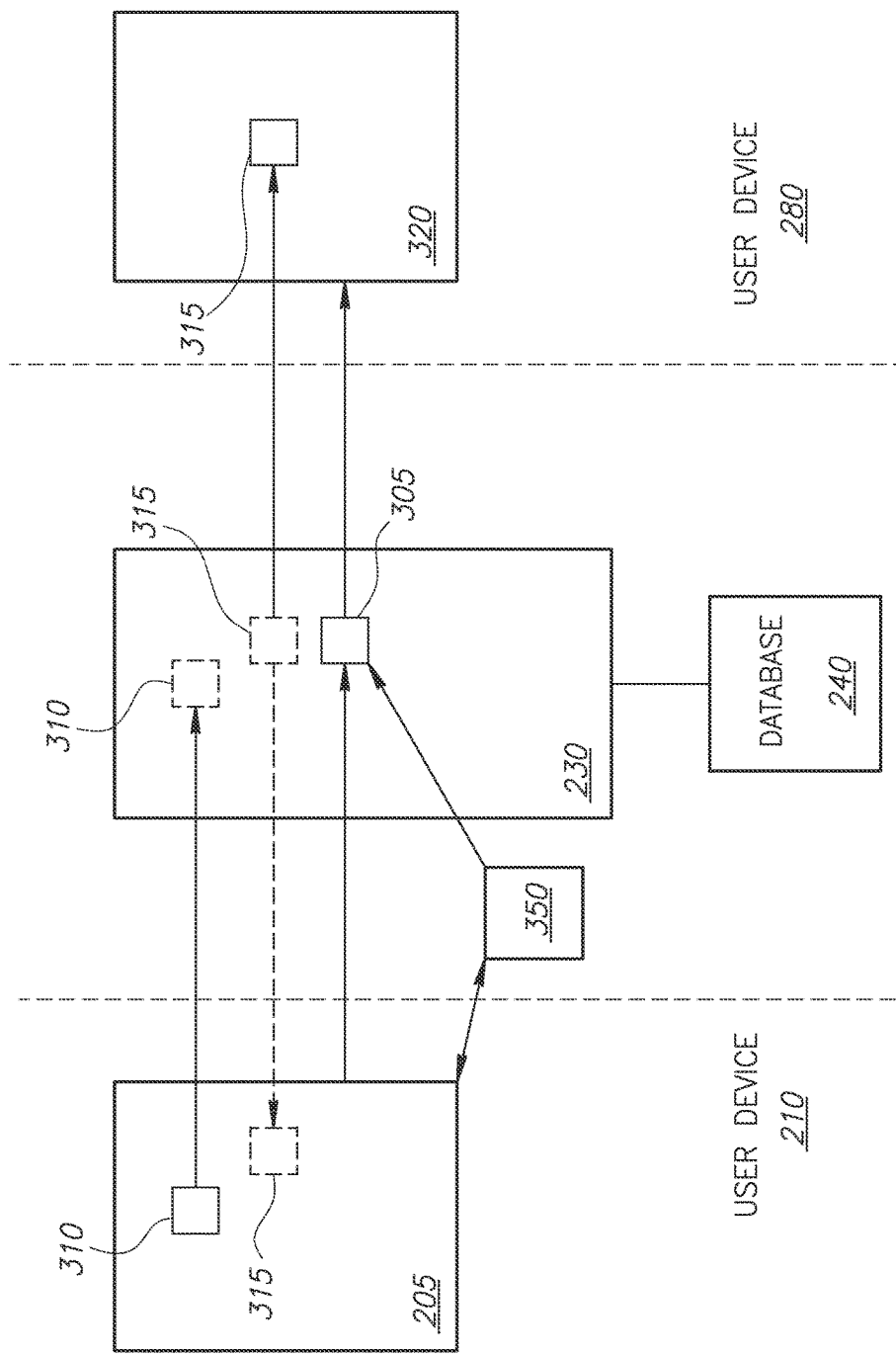
FIG. 3 shows a diagram of a suitable networked computing environment wherein a user may employ the various systems and methods of the subject matter disclosed herein.

The user devices 210, 280 are linked via the network 220 to server 230 so that computer programs, such as, for example, a browser or other applications, running on the user devices 210, 280 can cooperate in two-way communication with server 230. Server 230 may be coupled to database 240 and/or electronic storage 270 to retrieve information therefrom and to store information thereto. Moreover, and as best illustrated in FIG. 3, the server 230 may communicate with the user device 210 (and/or device 280) and/or GPS/triangulation systems 350 known in the art in such manner as to allow the server 230, using map data stored in the database 240, to generate location data 305, such as, for example, HTML data, that may be used by a browser or similar application to display the location of the device 210 (and/or device 280). Additionally, the server 230 may be coupled to the computer system 260 in a manner allowing the server to delegate certain processing functions to the computer system.

Referring to FIGS. 2 and 3, an embodiment includes a client-side application 205 executable on, for example, user device 210. Upon a command of a user of the device 210, the application 205 is operable to send to the server 230 a request 310, including identifying information (e.g., email address, phone number, a service subscriber's user name, etc.) of a user of the user device 280 (or other similar user device), to create authorization data (i.e., a "ticket") that will allow the user of the user device 280 (or the user of the other similar user device) to track the location of the user device 210 and, consequently, the user of the device 210. The application 205 is configured to provide a user interface (not shown) displayable on the display 250. The user interface functions to enable the user of the device 210 to select or otherwise input one or more values defining the start time and/or length of a time interval during which the user of the user device 280 may track the location of the device 210. These values are included in the request 310.

In response to the request 310, the server 230 is configured to generate the ticket 315 and forward the ticket to the user device 280. Alternatively, as indicated in dashed lines in FIG. 3, the server may provide the ticket 315 to the user device 210, whereupon the device 210 may then be used to forward the ticket to the user device 280. The ticket 315, which may be sent via SMS, email, or other suitable messaging format, includes pointing data, such as a selectable link to a URL, that, when selected by the user of the device 280, is configured to provide access to a tracking interface provided by the server 230. The ticket 315 may further include a default message or a customized message input by the user of the device 210.

Specifically, if the user of the device 280 selects a link to the pointing data, the server 230 is configured to provide location data 305 to the device 280 enabling a client application 320, a browser, or other interface resident on the device 280 to generate a display of the geographical location of the device 210. Advantageously, an embodiment merely requires a conventional browser be resident on the device 280 to display the location of the device 210, and does not otherwise require a specific application be installed on the device 280 to do so. The location data 305 may be provided to the device 280 in a recurring manner, such that the user of the device 280 may view the real-time movement of the device 210, or may be provided singly so as to merely provide a "snapshot" of the location of the device 210.

In an embodiment, the server 230 provides the location data 305 to the device 280 only during the time interval designated by the user of the device 210 in generating the request 310. In various embodiments, the user of the device 210 may set the time interval to commence upon the user device 280 first accessing the location data, set the time interval to occur during a specifically designated window of time (e.g., 2-3 PM of a particular day or set of days), or to occur at any other user-specified start and stop time. In an embodiment, the ticket 315 received by the user of device 280 may indicate the nature (e.g., time of commencement, duration, etc.) of the time interval. Additionally, in an alternative embodiment, the user of the device 210, rather than provide the time interval in the request 310 prior to the location data 305 being provided to the device 280, may provide and effectuate the time interval in a request after the device 280 has received the location data and begun tracking the device 210. Similarly, after the device 280 has received the location data and begun tracking the device 210, the user of the device 210 may revoke, or otherwise modify, the effective time interval originally included in the request 310 provided before generation of the ticket 315. Additionally, a particular ticket 315 may be extended to a user other than and additional to the user of device 280. In such case, the ticket may track absolute time remaining. As such, if the ticket 315 is a 30 minute ticket sent 20 minutes ago, it will expire in 10 minutes for both the old and new recipient. Additionally, a predefined, external event may function to modify the sharing-permission time interval. For example, the user of the device 210 may specify that the ticket 315 is valid only until the user has arrived at a user-specified destination. Alternatively, for example, the user of the device 210 may specify that the ticket 315 is valid only upon the user being a predetermined distance (e.g., one mile) from the user's departure location.

In an embodiment, the request 310 may further include an indication of a landmark to which the user and the user device 210 are travelling. Consequently, the server 230, by employing the map data associated with the database 240, may include the geographical location of the landmark with the location data 305.

It should be noted that, in an embodiment, all of the functionality discussed above as attributable to the server 230 may instead be performed solely by the application 205 executing on the user device 210 communicating directly with the user device 280 over the network 220. In such an embodiment, the request 310 need not be generated, and the ticket 315 is generated by the user device 210 and issued directly to the user device 280. In such an embodiment, the user device 210 may constantly, or otherwise periodically, send updates to the user device 280 until a time interval associated with a ticket 315 expires. Alternatively, the user device 280 may include an application configured to constantly, or otherwise periodically, poll the user device 210 for location data. As such, in varying embodiments, the server 230 is not necessary for implementation of the functionality described herein.

For purposes of the description herein, an embodiment of the present invention is directed to an integrated location sharing application that controls the process of sending or receiving a location message. By way of example, the integrated location sharing application may advantageously provide an easier and faster way to communicate as compared to a phone call or text message regarding the whereabouts of a sender and/or a recipient.

An Internet-enabled device such as, but not limited to, a mobile phone or a computer may receive a location message. In one embodiment, no software or setup is required to receive and potentially view the location message. A sender may send the location message to a specific person, several people, or even to a social networking site or group. For purposes of brevity hereinafter, the "recipient" may refer to one person, group, site, namespace, or more than one person, group, site, or namespace.

More specifically, the integrated location sharing application may take the form of an application downloaded onto a location-enabled mobile communications device that allows the sender to share their location via a map for a pre-set period of time with any recipient of the sender's choosing. With the integrated location sharing application, the sender remains in complete control on who sees their location, when they see their location and for how long they can view the sender's location.

Unlike other location-based services that require users to log in and build a friend network before use or set up a profile or other permissions, the integrated location sharing application may be used within seconds of downloading to a location-enabled mobile communications device such as, but not limited to a GPS-enabled mobile smartphone device. In one embodiment, the integrated location sharing application does not require the sender or the recipient to create an account to use the service, which eliminates login and password hassles.

Once downloaded, the sender may send a location message to any recipient by selecting a contact or contacts, choose a duration they want their location to be available to the recipient, and then hit send on their mobile communications device. The integrated location sharing application permits the sender to set a timer for how long their location may be shared. The sender has the ability to "pause" or "cancel" the location message at any time or choose to extend a current location message. On the receiving end, the recipient merely needs an Internet-enabled device or email access to receive the location message and view sender's whereabouts on a map. By way of example, the recipient receives an SMS or email message with a unique URL that can be clicked to open a browser window having a map displaying the sender's precise location in a context of other landmarks, streets, etc.

In one embodiment of the present invention, the integrated location sharing application interfaces with a text message, a URL link, and/or an email platform that resides on the sender's mobile communications device. The integrated location sharing application may also interface with other types of input such as, but not limited to, gesture input, motion detection, third party transmissions, radio frequency identification information, or other scenario-based automated inputs.

Figure 4:
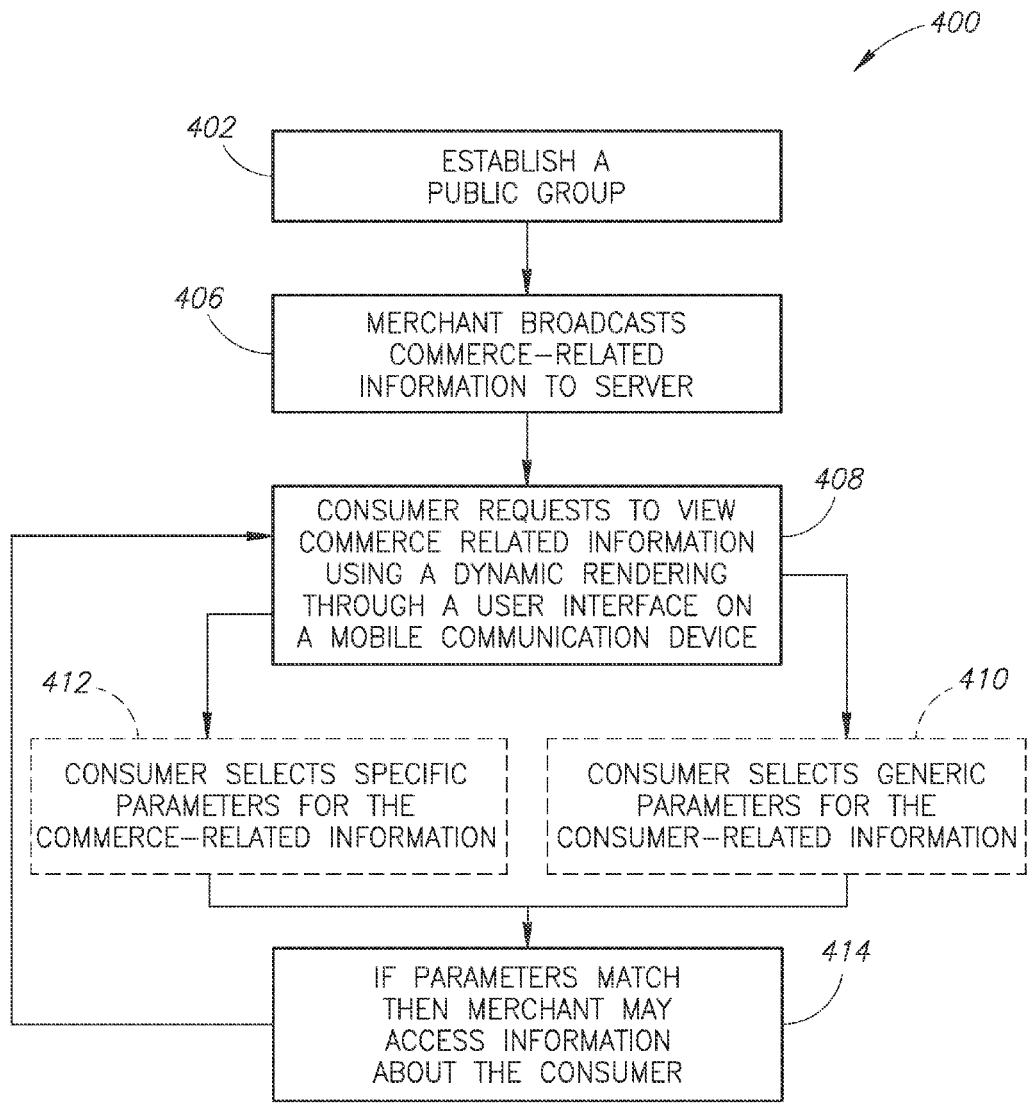
FIG. 4 is a flow diagram of a supply-side method for creating and utilizing a public group according to an embodiment of the present invention.

FIG. 4 shows a method 400 for operating a dynamic marketplace, and more specifically shows a method 400 in which a merchant may selectively interact with one or more consumers for potential commerce-related activities. At Step 402, a public group is established by creating a name for the public group or creating keywords that may or may not map directly to the name. The public group may be established using the integrated location sharing application. In one embodiment, the public group may take the form of a name selected by the merchant, and that name may be attached to information submitted to the group either by the merchant or by another person with access to the public group. By way of example, the merchant submits the name of the public group to a server. To access or post information in the public group, a person only needs know the name of the public group. If information is submitted under a different name that is not associated with the public group established at Step 402, then the server may optionally and automatically establish a new public group. The name of the public group resides on one or more servers and may be searchable, joinable, filterable, etc.

In one embodiment, the public group is established or exists as soon as someone references it. For example, a person may decide to broadcast their location to a group they believe is called the "SeattleCyclists." If the so-named group already exists then the person may automatically join it. If the group did not exist then it would be automatically established. Stated otherwise, the act of sharing information with a non-existent group would automatically establish the group without further action of the person sharing the information. Once the group is established, the public group named the "SeattleCyclists" will appear on a map that may be accessed by others who may eventually join the group.

By way of analogy, the public group may operate similar to a physical bulletin board or kiosk in which a person that knows the location of the bulletin board or kiosk may add information to or receive information from the board or kiosk. Unlike a physical board however, the act of adding information to the board (i.e., public group) operates to establish that board or otherwise bring that board into a utilitarian existence. Stated otherwise, adding information to a newly named public group is the only requirement for creation of that newly named public group. Either way, adding information to establish a group or merely selecting a name operates to bring the public group into existence. Further to the board example, information posted on the "Blue Board" may be publicly available because the board has a name and because that name has been submitted to the server. The act of posting information on the "Blue Board" both establishes and defines how others can find that board.

At Step 406, the merchant broadcasts commerce-related information (e.g., product and/or service categories) to the server. For example, the merchant may submit information related to promotional discounts, sales, specials, etc. At Step 408, the consumer may request to view the commerce-related information using dynamic rendering on a graphical user interface of a mobile communication device. In one embodiment, the information may be dynamically rendered on the graphical user interface by displaying a list or a map on the device to provide a real-time, dynamic marketplace for a merchant's goods, services and the merchant's location information. By way of example, dynamically rendering may be broadly interpreted to mean that location and/or deal information associated with the merchant is updated as this information is uploaded to the server. The information dynamically rendered to the consumer would preferably reflect the most currently available information (e.g., new or expired sales, new or expired discounts, limited time offers, etc.). The dynamic marketplace may or may not include the ability to generate or support financial transactions between the merchant and the consumer.

The consumer, when viewing the commerce-related information, may optionally filter or search the information provided by the merchant that is available to the public group. Optionally at Step 410, the consumer selects generic parameters for the consumer-related information. Generic parameters may be defined as a type of good or service (e.g., pizza dishes or pasta dishes at a pizza restaurant). Optionally at Step 412, the consumer selects specific parameters for the consumer-related categories. Specific parameters may be applied to narrow the generic parameters. By way of example, the specific parameter may be a type of good or service within a certain price range (e.g., pizza dishes or pasta dishes at a pizza restaurant that are less than ten dollars or between five and ten dollars). The term parameter as used herein may broadly be interpreted as an attribute, a category, or some other type of information such as, but not limited to, location or proximity, percentage off, food type, etc. that assists the consumer in filtering or focusing on commerce-related information provided by the merchant. The parameters may be entered in real-time by the consumer or pre-set (e.g., stored) by the consumer.

The parameters used for filtering may include explicit elements and/or implicit elements set by the merchant, the consumer or both. By way of example, the consumer may select a specific, explicit parameter for "only suppliers in this price range;" whereas the merchant may choose to explicitly limit the commerce-related information to "only consumers within a certain area or region for the duration of a limited time offer." Additionally or alternatively, the consumer may utilize generic or specific parameters that are implied. By way of example, the consumer may filter the merchant information using a consumer-controlled profile that implies the consumer likes going to movies or museums. The consumer may also apply filters on predefined templates like "fun activities for groups" or on business relationships like "sponsoring merchants" or "subscribing customers receive preferential treatment."

At Step 414, the method 400 determines whether the consumer's filter or search parameters sufficiently match the information provided the merchant. Stated otherwise, the server may identify a correlation between parameters. In one embodiment, matchmaking may be accomplished by comparing generic and/or specific parameters set by the consumer to the information provided by the merchant. When the parameters sufficiently match, the merchant may be provided access to information about the consumer such as, but not limited to, the consumer's current location, likes or dislikes, price ranges, etc.

Accessing the public group may allow the merchant, the consumer, or both to obtain and view static content such as, but not limited to, text, images or video and/or dynamic content such as, but not limited to, a constantly updated stream of location information of one or more entities or persons in the public group. Additionally or alternatively, pricing and/or transaction information may be made readily available to the public group by the merchant or shared by a consumer of the public group.

The participants in the public group do not need to be part of the same network nor is there any requirement that the participants exchange any private information. The participants, most likely the consumers, would be able to remain anonymous as long as desired. Further, the merchants may provide a level of anonymity or privacy when naming the public group. By way of example, the merchant may establish a public group called "acg12342kjlkds983242sn." In doing so, the merchant may purposefully obfuscate the name of the public group such that the probability of someone guessing that name is minimal. This obfuscation technique would permit the merchant to selectively share the name of the public group with preferred consumers or other merchants.

Figure 5:
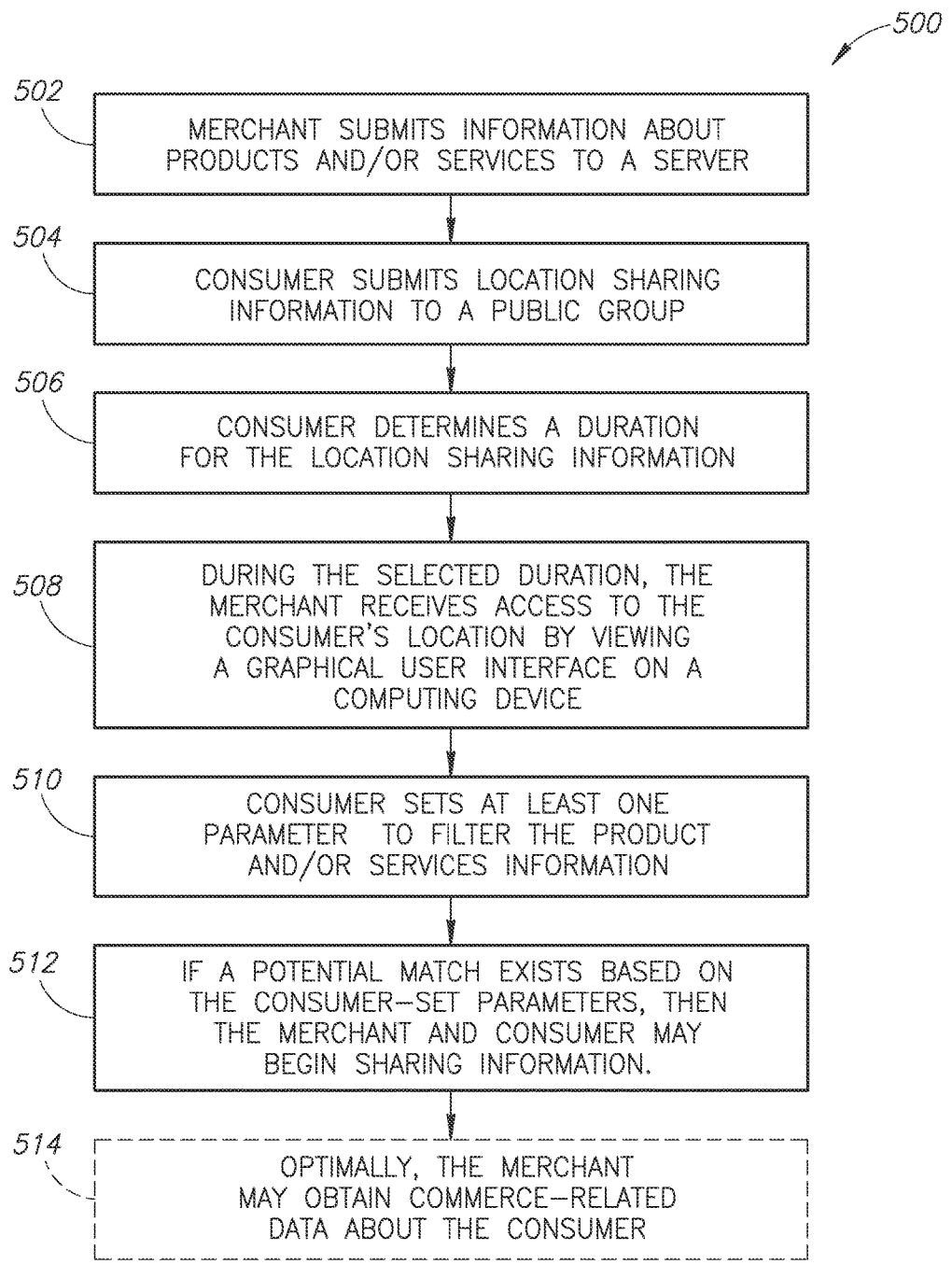
FIG. 5 is a flow diagram of supply-side or demand-side method for creating and utilizing a public group according to an embodiment of the present invention.

FIG. 5 shows a method 500 for consumer-to-merchant information sharing. At Step 502, a merchant submits commerce-related information about the merchant's products and/or services to a server. At Step 504, the consumer may submit location sharing information identifying a current location of the consumer to a public group, wherein the public group had been previously established by the merchant or someone else. In one embodiment, the public group may take the form of a namespace that alerts participants to a merchant of interest in a particular or selected area.

At Step 506, the consumer may selectively determine and control a period of time (e.g., duration) for the location sharing information with the public group. By way of example, the location sharing information may include a message from the consumer to the merchant for the merchant to share their location for a period of time, for example to assist the consumer in navigating to the merchant. Additionally or alternatively, the consumer may share their own location information with the public group, and thus the merchant, so that the merchant will know that consumer is within a certain area or region or type of service.

At Step 508 and during the duration, the public group and the merchant may receive access to the consumer's location by viewing a dynamic rendering of the consumer's location on a graphical user interface of a computing device. In one embodiment, the merchant may view a map of the region with a pinpoint symbol identifying an exact location of the consumer. In one embodiment, the consumer may be anonymous such that the information accessible by the merchant may merely provide a driving distance between the anonymous consumer and the merchant. Further, the dynamic rendering may be programmatic and not on a graphical user interface.

At Step 510, the consumer may set at least one parameter to filter or search the information provided by the merchant. At 512, the method 500 determines whether a potential match exists based on the consumer-selected parameter as compared to the merchant information. If the potential match exists then the merchant and consumer may begin sharing additional information such as, but not limited to, commerce-related information. Again, the consumer may remain anonymous or make a direct connection with the merchant. Optionally at Step 514, the merchant may obtain commerce-related data about the consumer.

In one example of consumer-to-merchant or merchant-to-consumer location and information sharing, the merchant may take the form of a delivery service (e.g., a courier, flower company, furniture company, etc.), a home servicing business (e.g., an internet provider, a plumber, etc.), a transportation company (e.g., a limo, a taxi, an airport shuttle, etc.), and/or a mobile business (e.g., a bus, ice cream truck, etc.). The merchant may want to share their current location information with the consumer to let the consumer know that the merchant is on the way to make the delivery, for example. Because the merchant and the consumer are part of the same public group, the merchant may send their location information to the consumer for a select period of time. In turn, the consumer may watch the current location information of the merchant by rendering the merchant's location on a map using a device. The current location information may be continually updated through the server. In this example, the sharing of location information by the merchant with the consumer would allow the consumer to better anticipate an arrival time of the merchant.

In one example of consumer-to-merchant or merchant-to-consumer location and information sharing, the merchant may take the form of a pizza restaurant or a coffee shop. The consumer may want the merchant to know that the consumer may be driving by or is within a certain proximity to the restaurant or shop. The consumer may send location sharing information to the merchant using the public group and the server. In turn, the merchant will be able to view the consumer's location.

The consumer-to-merchant or merchant-to-consumer location and information sharing may occur in an enterprise environment to establish a dynamic marketplace (i.e., public group), which may be instantly established and utilized. For example, in one embodiment, someone looking to find a specific category of information could search for via keyword for that information. So, as an example, a consumer (demand side) can access pizza deals by looking at the location of a public group named !PizzaDeals. An enterprise (supply side) can also broadcast commerce-related information to those consumers through the public group named !PizzaDeals. Information added by pizza merchants is shown to the consumers. The information may take the form of the merchant's location, discounts, coupons or other information. Information received by merchants could be filtered based on the consumer's present location or other criteria. The naming and creation of public groups is discussed in greater detail below.

Figure 6:
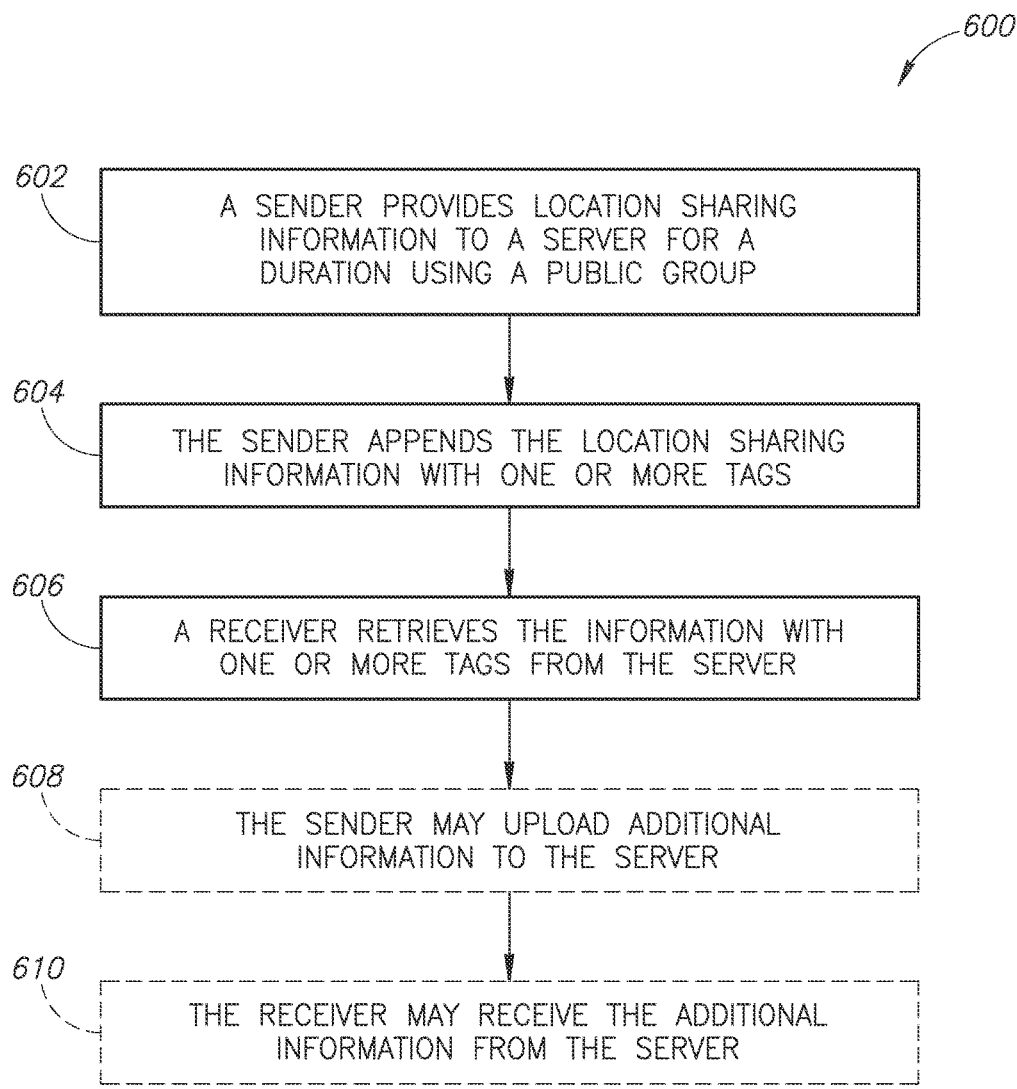
FIG. 6 is a flow diagram of a method for controlling location and other information sent to a public group according to an embodiment of the present invention.

FIG. 6 shows a method 600 for dynamically forming and utilizing public groups to share location and other information in a variety of environments. In one embodiment, the public group may correlate or be associated with a social environment. At Step 602, a sender may provide location sharing information to a server for the public group for a select period of time (i.e., duration), and where the select period of time is continually within the control of the sender to expire the time, extend the time or otherwise update the time. At Step 604, the sender may append the location sharing information with one or more tags, which may take the form of attributes. In one embodiment, the tag may be associated with the location sharing experience. By way of example, the tag may be a satellite view for a map, a map with a defined radius of a region, a map that includes a driving speed of one or more participants of the public group. Alternatively or additionally, the tag may be the name of the public group as well.

In one embodiment, the sender does not need to be aware of the current state or existence of the public group to provide location sharing information with the public group. Stated otherwise, the act of joining the public group implicitly indicates that the sender is willing to provide location sharing information with the public group with the restriction that the sender may have full control of at least a time period for which the location sharing information is made available to the public group. At Step 606, a receiver may retrieve or otherwise obtain location sharing and other information from the server related to the one or more tags. The receiver may be any person in the public group and may retrieve the location sharing information or other information by knowing the name of the tag.

In one embodiment, the public group names may be designated with an exclamation point at the beginning of the name. The exclamation point may be referred to as a "bang". An example of a bang used to name a public group may be !BostonMarathon, which designates a public group of people sharing their locations related to the Boston marathon running event. A runner, vendor, volunteer or someone else may dynamically participate in the public group named !BostonMarathon. A runner, for example, could broadcast to !BostonMarathon to share their location in real-time on a dynamically rendered map viewable on a mobile communication device. Any other person in the public group could view all the !BostonMarathon broadcasters by keying off of the !BostonMarathon keyword. (e.g., Glympse.com/!BostonMarathon)—even from a laptop in San Francisco). By way of further example, a relative in Seattle may watch a runner's progress in the Boston marathon in real time by becoming part of the public group named !BostonMarathon.

At Step 608, the sender may optionally upload additional information to the server for access to the public group. For example, the runner may upload a personal best running time previously obtained in a marathon race or a personal best goal for the present Boston marathon running event. The additional information may take a wide variety of forms and purposes, but generally includes any information that is over and above the location sharing information. At Step 610, the receive may receive the additional information from the server.

In other examples of method 600, the sender may want to let a public group of persons that are on the sender's soccer team know that the sender is on their way to a particular soccer field. The sender may want to share their location with other persons associated with the sender's social network. In the social network environment, the members of the public group may let other members know their whereabouts and vice-versa.

Figure 7:
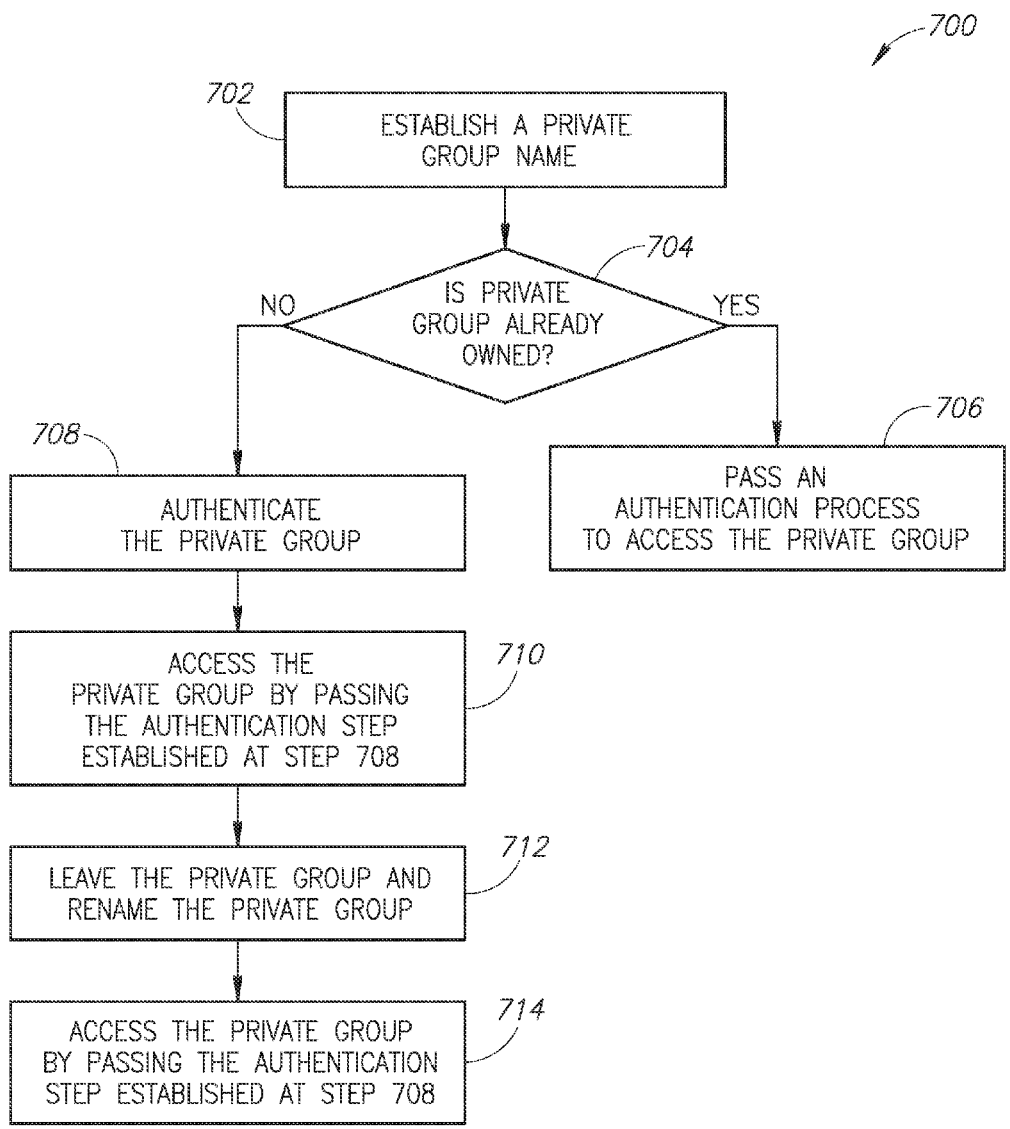
FIG. 7 is a flow diagram of a method for creating and utilizing a private group according to an embodiment of the present invention.

FIG. 7 shows a method 700 for creating and utilizing private groups to share location and other information. Similar to a public group, a private group may be established by the act of adding information to it and then it may be viewed by its name. Private groups differ from public groups in that the act of being the first person to share with the private group establishes the private group while allowing for restricted access to the private group. The ability to interact with the private group such as, but not limited to, viewing, editing, inviting, controlling settings, etc. may be restricted and optionally altered dynamically. In one embodiment, private groups may be signified by an exclamation point at the beginning and the end of a private group name. By way of example, a first user may wish to share location information with a private group named "!AustinFamily!" in much the same way that would be done in public groups. For purposes of clarity, the name !AustinFamily would be a public group and the name !AustinFamily! would be a private group. The added "bang" at the end of the private group name would distinguish it from the public group name. In one embodiment and as explained in greater detail below, the members of the private group would be provided authenticated access to the private group.

At Step 702, a private group is established by selecting a private group name. The private group should preferably have a unique name, and particularly a name that is different from any public group in existence at the present time. At Step 704, the method 700 determines whether the private group is already owned by another user. If yes, then at Step 706, the first user would be required to pass an authentication process that had been established by another user of the private group or by a creator of the private group.

If the private group is not owned, then at Step 708 the first user may authenticate the private group. Authenticating the private group may be accomplished in a variety of ways such as, but not limited to providing a phone number authentication, a third-party login, a user-selected password, a quick response (QR) code, etc. The first user (e.g., the authenticating user) may share their location with the private group and optionally set authentication restrictions for the private group.

At Step 710, a second user or subsequent participant in the private group would be required to pass an authentication process setup by the first user to participate in the private group. The first user, who owns authentication of the private group, may specify what restrictions are required to participate in the private group. By way of example, the second user would need to know both the name of the private group name and be able to pass the authentication process before being allowed access to the first user's location sharing information. Authentication may be required for such activities as sharing, viewing, changing destinations, changing sharing durations, avatar, location indicators, colors, map types, proximity notifications, proximity requirements, etc.

At Step 712, the private group may continue to exist even after the first user leaves the private group. Thus, the first user may leave the private group, which would permit the second user to rename the private group, but not permit the second user to establish a different authentication process or require a different password. In the example of the private group named !AustinFamily!, the second user, who is not the authenticating user, would have their actions be restricted by the first user's authentication settings. At Step 714, a third user and any other subsequent users may access the private group by passing the authentication process established by the first user.

Figure 8:
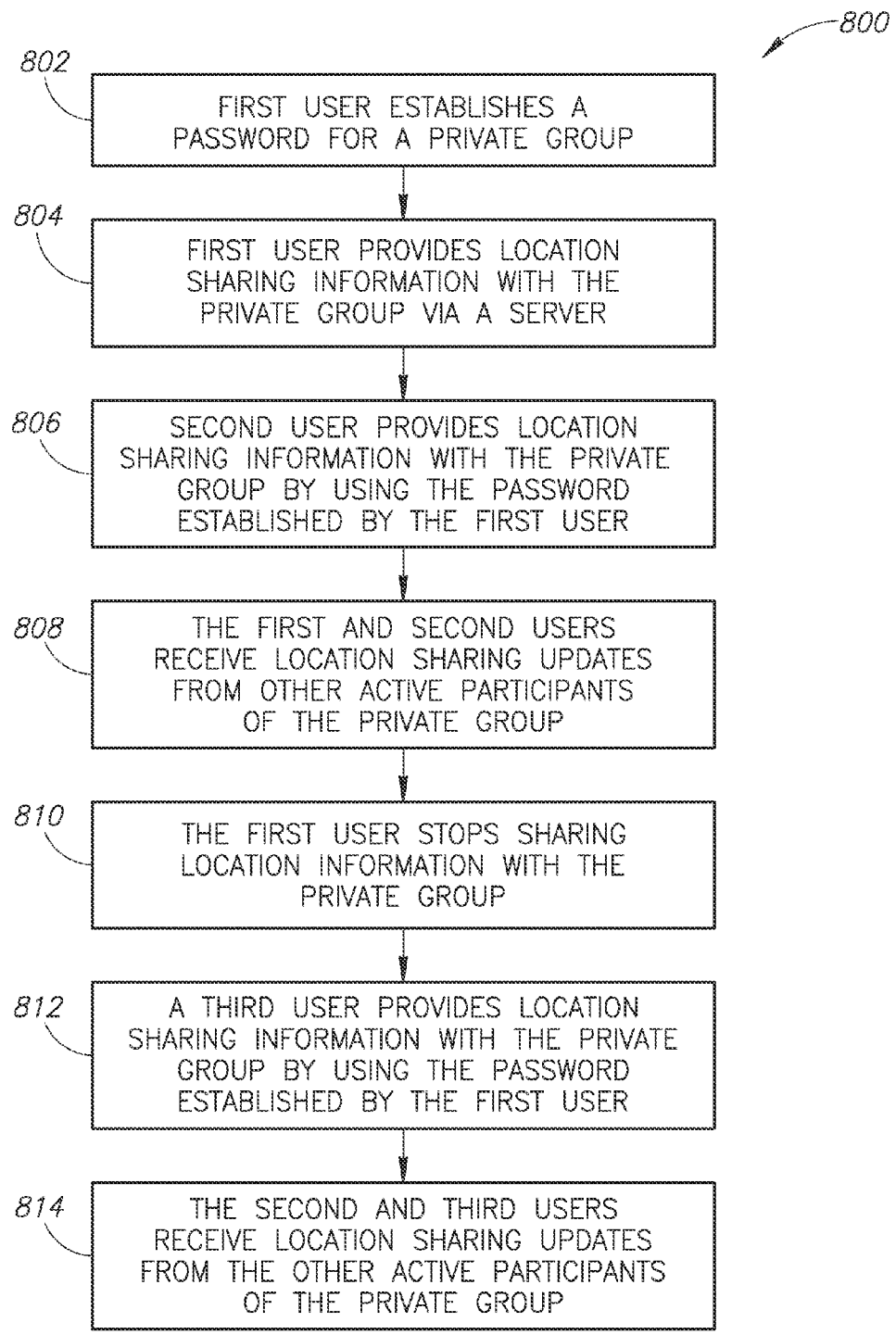
FIG. 8 is a flow diagram of a method for authenticating a private group according to an embodiment of the present invention.

FIG. 8 shows an exemplary method 800 for authenticating and using a private group according to an embodiment of the invention. At Step 802, a first user establishes a name and a password for a private group. At Step 804, the first user provides location sharing information with the private group by way of a server. At Step 806, a second user provides location sharing information with the private group by using the password established by the first user. At Step 808, the first and second users may receive updates to the location sharing information provided by both users and from other active participants in the private group.

At Step 810, the first user stops sharing location information with the private group. The first user may even choose to not be a member or participant of the private group. At Step 812, a third or subsequent user may provide location sharing information with the private group by using the password established by the first user. At Step 814, the second and third users receive updates to location sharing information provided by each other and/or by other, active participants of the private group.

The various embodiments described above can be combined to provide further embodiments. All of the above U.S. patents, patent applications and publications referred to in this specification are incorporated herein by reference. Aspects can be modified, if necessary, to employ devices, features, and concepts of the various patents, applications and publications to provide yet further embodiments.

These and other changes can be made in light of the above detailed description. In general, in the following claims, the terms used should not be construed to limit the invention to the specific embodiments disclosed in the specification and the claims, but should be construed to include all types of media imaging, media cutting and media processing that operate in accordance with the claims. Accordingly, the invention is not limited by the disclosure, but instead its scope is to be determined entirely by the following claims

The invention claimed is:

1. A computer-implemented method for sharing user location information, the method comprising:
   receiving, at a server comprising at least a central processing unit, from a sender device over the internet:
      the user location information specifying a real-time location of a user, for access by a specified group, wherein the real-time location of the user is retrieved by an integrated location sharing application of a mobile device that retrieves the user location information based on data from a GPS module of the mobile device; and
      an instruction indicating a duration of time in which the user location information is shareable;
   appending one or more tags that, when appended, become one or more appended tags, wherein at least one of the one or more appended tags provides additional information, about the user of the sender device, that was provided separately from the user location information;
   adding the user of the sender device to the specified group by associating an identifier for the user of the sender device with an identifier for the specified group in a data structure maintained at the sever;
   for at least one participant of the specified group that is not the user of the sender device, determining that the at least one participant is expected to have an interest in at least one tag,
      wherein the determining is based on identifying a match between:
      (A) search parameters set by the at least one participant or profile characteristics for the at least one participant, and
      (B) the one or more appended tags;
   determining that a current time is within the duration of time; and
   in response to the determining that the at least one participant is expected to have an interest and that the current time is within the duration of time, providing, to the at least one participant, access to the user location information.

2. The method of claim 1, wherein the at least one participant, in the specified group, is a merchant.

3. The method of claim 1, wherein the at least one participant in the specified group is a member of an online social network that matches an online social network of which the user of the sender device is a member.

4. The method of claim 1, wherein the specified group was created in response to:
   receiving the user location information; and
   determining that the user location information is associated with a message specifying a name of the specified group with a prefix that is a character previously defined to indicate following characters are a group name.

5. The method of claim 4, wherein the specified group is created as a public group based on the prefix character having been previously defined to indicate a public group.

6. The method of claim 4, wherein the specified group is created as a private group based on the prefix character having been previously defined to indicate a private group.

7. The method of claim 1, wherein the one or more appended tags comprise one or more of:
- a name of a group;
- one or more attributes of the user of the sender device;
- a map with features relating to the sender device;
- statistics relating to the user of the sender device;
- a goal set by the user of the sender device; or
- any combination thereof.

8. The method of claim 1, further comprising adding the user of the sender device to the specified group based on the received user location Information being associated with a message specifying a name of the specified group with a prefix of a character previously defined to indicate following characters are a group name.

9. The method of claim 1, wherein location information for multiple members of the specified group is automatically transmitted based on individual settings for the multiple members of the group.

10. A computer-readable storage medium storing instructions that, when executed by a computing system, cause the computing system to perform a procedure for sharing user location information, the procedure comprising:
- receiving, at a server comprising at least a central processing unit, from a sender device over the internet:
  - the user location information specifying a real-time location of a user, that is accessible by a specified group,
    - wherein the real-time location of the user is retrieved by an integrated location sharing application of a mobile device that retrieves the user location Information based on data from a GPS module of the mobile device; and
  - one or more appended tags, wherein at least one of the one or more appended tags provides additional information about the sender device or a user of the sender device;
- adding the user of the sender device to the specified group by associating an identifier for the user of the sender device with an identifier for the specified group in a data structure maintained at the sever;
- for at least one participant of the specified group that is not the user of the sender device, determining that the at least one participant is expected to have an interest in the at least one tag,
  - wherein the determining that the at least one participant is expected to have an interest in the at least one tag is based on identifying a match between:
    - (A) search parameters set by the at least one participant or profile characteristics for the at least one participant, and
    - (B) the one or more appended tags; and
- in response to the determining that the at least one participant is expected to have an interest, providing, to the at least one participant, access to the user location information,
  - wherein the server receives an instruction indicating a duration of time during which the user location information is shareable;
  - wherein the procedure further comprises determining that a current time is within the duration of time; and
  - wherein the providing, to the at least one participant, the access to the user location information, is further in response to the determining that the current time is within the duration of time.

11. The computer-readable storage medium of claim 10, wherein the specified group is a group that has membership that is open to the public.

12. The computer-readable storage medium of claim 10, wherein the one or more appended tags comprise one or more of:
- a name of a group;
- one or more attributes of the user of the sender device;
- a map with features relating to the sender device;
- statistics relating to the user of the sender device;
- a goal set by the user of the sender device; or
- any combination thereof.

13. The computer-readable storage medium of claim 10, wherein at least one of the one or more appended tags was provided separately from the user location information.

14. The computer-readable storage medium of claim 10, wherein the adding of the user of the sender device to the specified group is based on the received user location information being associated with a message that includes a prefix character that was previously defined to indicate following characters are a group name.

15. The computer-readable storage medium of claim 10, wherein location information for multiple members of the specified group is automatically transmitted based on individual settings for the multiple members of the group.

16. A system for sharing user location information, the system comprising:
- one or more processors; and
- a memory storing instructions that, when executed by the one or more processors, cause the system to perform operations comprising:
  - receiving, over the internet from a sender device comprising at least a central processing unit:
    - the user location Information specifying a real-time location of a user, that is accessible by a specified group,
      - wherein the real-time location of the user is retrieved by an integrated location sharing application of a mobile device that retrieves the user location information based on data from a GPS module of the mobile device; and
    - one or more appended tags, wherein at least one of the one or more appended tags provides additional information about a user of the sender device;
  - adding the user of the sender device to the specified group by associating an identifier for the user of the sender device with an identifier for the specified group in a data structure maintained at the sever;
  - for at least one participant of the specified group that is not the user of the sender device, determining that the at least one participant is expected to have an Interest in the at least one tag; and
  - in response to the determining that the at least one participant is expected to have an interest, providing, to the at least one participant, access to the user location information
    - wherein the server receives an instruction indicating a duration of time during which the user location information is shareable; and
    - wherein the operations further comprise determining that a current time is within the duration of time; and
    - wherein the providing, to the at least one participant, the access to the user location information, is further in response to the determining that the current time is within the duration of time.

17. The system of claim 16, wherein the operations further comprise adding the user of the sender device to the specified group based on the received user location information being associated with a message specifying a name of the specified group with a prefix of a character previously defined to indicate following characters are a group name.

* * * * *